US006167371A

United States Patent [19]

Miet et al.

[11] Patent Number: 6,167,371

[45] Date of Patent: Dec. 26, 2000

[54] SPEECH FILTER FOR DIGITAL ELECTRONIC COMMUNICATIONS

[75] Inventors: Gilles Miet; Daniela Parayre-Mitzova, both of Le Mans, France

[73] Assignee: U.S. Philips Corporation, New York, N.Y.

[21] Appl. No.: 09/395,050

[22] Filed: Sep. 13, 1999

[30] Foreign Application Priority Data

Sep. 22, 1998 [FR] France .................................. 98 11812

[51] Int. Cl.[7] ............................ G10L 19/14; H04B 3/21; H04M 1/253; H04M 9/08

[52] U.S. Cl. .......................... 704/205; 704/200; 704/201; 381/71.7; 379/406; 370/282; 370/286; 370/290

[58] Field of Search .................................... 704/212, 213, 704/209, 226, 258; 375/241, 244

[56] References Cited

U.S. PATENT DOCUMENTS

| | | | |
|---|---|---|---|
| 4,617,676 | 10/1986 | Jayant et al. | 375/27 |
| 4,868,867 | 9/1989 | Davidson et al. | 704/223 |
| 4,969,192 | 11/1990 | Chen et al. | 704/222 |
| 5,864,798 | 1/1999 | Miseki et al. | 704/224 |

OTHER PUBLICATIONS

A. El–Jaroudi, J. Makhoul, "Discrete All–Pole Modeling," IEEE Transactions on Signal Processing, Feb. 1991.

B. Zeng, T. Laasko, Y. Neuvo, "Error Feedback for Floating–Point Cascade–Form Digital Filters", International Conference on Acoustics, Speech and Signal Processing, Apr., 1991.

*Primary Examiner*—Richemond Dorvil
*Assistant Examiner*—Daniel A Nolan
*Attorney, Agent, or Firm*—Dicran Halajian

[57] ABSTRACT

A filter device filters a speech signal that has a frequency spectrum featuring slopes separated by valleys. The filter device amplifies the slopes and attenuates the valleys for improving the intelligibility of the signal. The filter device includes a predictive speech signal analysis circuit for determining a polynomial whose coefficients are Linear Predictive Coding (LPC) parameters. The filter device further includes a calculator for synthesizing a digital post filter of the zeroes/poles type based on this polynomial. An extraction circuit of the filter device taps values of poles by extracting roots of the polynomial, and an interpolation circuit between the values of poles derives therefrom the zero values of the post filter.

9 Claims, 3 Drawing Sheets

SPEECH FILTER FOR DIGITAL ELECTRONIC COMMUNICATIONS

DESCRIPTION

Field of the Invention

The invention relates to a digital filter device for filtering a speech signal that has a frequency spectrum featuring slopes separated by valleys, the device including a predictive analysis circuit of the speech signal and a calculation element for synthesizing a digital zero-pole post filter intended for the amplification of the slopes and the deepening of the valleys.

The invention also relates to a telephone receiver intended for the reception of a speech signal that has a frequency spectrum featuring slopes separated by valleys, the receiver including a predictive analysis circuit of the speech signal and a calculation element for synthesizing a digital zero-pole post filter intended for the amplification of the slopes and the deepening of the valleys.

The invention relates to a baseband speech signal communications system having at least one transmission channel and including:

- a predictive speech coder/decoder for restoring a digital speech signal based on an original coded signal transmitted by said channel,
- a filter for filtering said digital speech signal.

The invention further relates to a filter method for filtering a speech signal that has a frequency spectrum featuring slopes separated by valleys, with a view to increasing the slopes and deepening the valleys, the method including:

- a predictive analysis step of the speech signal for determining LPC coefficients,
- a calculation step for synthesizing a zeroes/poles filter based on said LPC coefficients, and
- a filtering step for applying said synthesized filter to the speech signal.

The invention finally relates to a speech signal obtained by applying a digital zeroes/poles filter to a first speech signal that has a frequency spectrum featuring slopes separated by valleys, which first speech signal may be modeled by means of an inverse all-pole LPC filter.

The invention has many applications in voice calls, notably in mobile radiotelephone systems.

BACKGROUND OF THE INVENTION

United States patent published under U.S. Pat. No. 4,617,676 describes a digital communications system receiving on its input a speech signal that has a frequency spectrum featuring slopes interspersed with valleys, the system including a predictive speech decoder for determining predictive parameters of the received signal, and a post filter intended for the production on the output of a signal modified in dependence on the predictive parameters, for increasing the slopes and deepening the valleys.

The importance of the post filtering is to augment the audio quality of speech signals in view of improving the intelligibility and thus better responding to the needs of the users. In the following, the term post filter designates a filter intended to improve the audio quality of the signal.

SUMMARY OF THE INVENTION

Cited prior art is applied to a digital communications system including, at the transmitter end, a predictive speech coder for generating a speech model based on LPC (Linear Predictive Coding) parameters obtained by means of a zeroes/poles LPC analysis filter, that is to say, having poles and zeroes, and, at the receiver end, a predictive decoder for restoring a speech signal based on the received model by means of an LPC synthesis filter and post filter means for improving the quality of the restored signal as a function of the LPC parameters produced by the predictive speech coder. For the post filtering it is necessary to synthesize a digital filter, called post filter, of the zeroes/poles type, whose values of zeroes and poles correspond, except for one factor, to the values of zeroes and poles of the LPC analysis filter. For forming the post filter, cited United States patent thus provides the use of the poles and the zeroes obtained via the LPC analysis effected by the speech coder and transmitted to the decoder. The values of poles and zeroes received by the decoder are then situated at the same frequencies as the slopes and valleys respectively, of the input signal.

The present invention provides, on the other hand, the use of only the values of poles defined by an LPC analysis and the calculation of the values of zeroes of the post filter by interpolation between the values of poles coming from the LPC analysis. The result is greater flexibility when determining zeroes whose position may be fixed with a precision depending on the quality and intelligibility sought for the output signal. Moreover, the invention is compatible with the most widespread GSM (Global System for Mobile communications) radiotelephony speech coders, notably the full-rate speech coders in accordance with Recommendation ETS 300 961, paragraph 3, dated December 1997, second edition. The coders operate with all-pole LPC analysis filters, which transmit only values of poles to the decoder.

According to the invention, there are provided a filter device and a telephone receiver as defined in the opening paragraph, characterized in that they include an extraction circuit for extracting values of poles from the output of the predictive analysis circuit and for supplying them to the calculation element, and interpolation means between said values of poles for determining the values of zeroes.

The invention also provides a communications system as defined in the opening paragraph, characterized in that the filter includes calculation means for synthesizing a digital zeroes/poles filter, an extraction circuit for extracting values of poles from the output of the predictive speech coder/decoder and interpolation means between said values of poles for determining the values of zeroes.

Also provided is a method of the type defined in the opening paragraph, characterized in that the calculation step comprises:

- an extraction step intended to extract the roots of an LPC polynomial formed on the basis of said LPC coefficients for deriving from them the values of poles, and
- an interpolation step between said values of poles for determining said values of zeroes.

Finally, the invention applies to a signal as described in the opening paragraph, characterized in that the values of poles of the zeroes/poles filter are obtained by extracting the poles from said inverse LPC filter and in that the values of zeroes are obtained via an interpolation calculation between said values of poles of the all-pole filter.

The invention is particularly advantageous when the signal has previously been subjected to a predictive LPC analysis and when its LPC parameters are available at the moment of post filtering.

BRIEF DESCRIPTION OF THE DRAWINGS

These and other aspects of the invention are apparent from and will be elucidated, by way of non-limitative example, with reference to the embodiments described hereinafter.

In the drawings.

DESCRIPTION OF THE EMBODIMENTS

Figure 1:
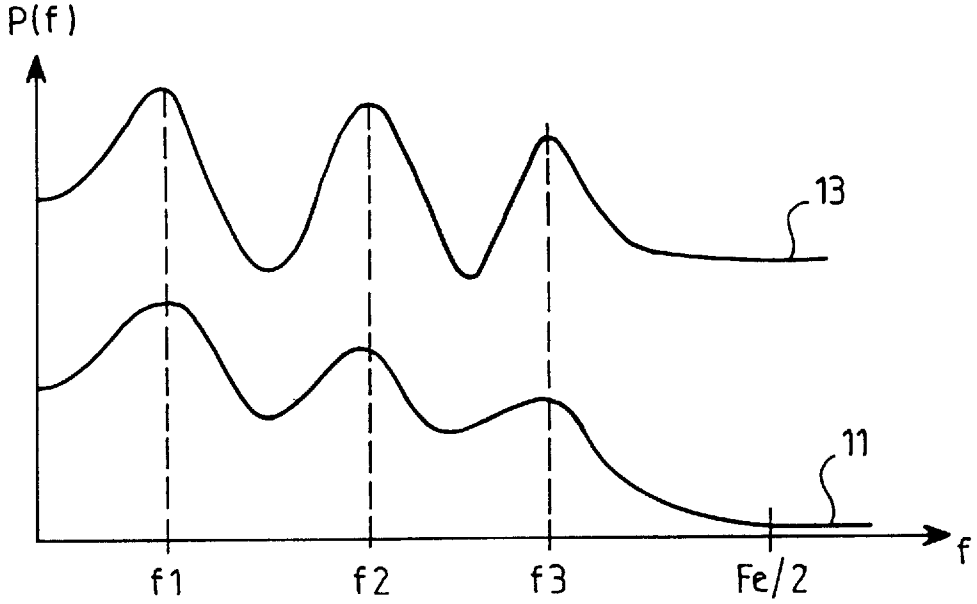
FIG. 1 is a graph comprising two curves representing the spectrum of a speech signal before and after filtering according to the invention.

The curve 11 in FIG. 1 is a representation of the spectral frequency of a speech signal representing the amplitude P of the spectrum of the signal as a function of its frequency f. This signal may be analog or digital. In the latter case it may come, for example, from the output of a predictive speech decoder of the type based on LPC analysis methods currently used in mobile radiotelephony and, more particularly, in the GSM systems.

This spectrum features amplitude slopes or peaks at the frequencies f1, f2 and f3 separated by valleys, which are lower than the highest frequency of the spectrum denoted Fe/2. To improve the audio quality of such a signal, a post filter device is provided intended to increase the slopes and deepen the valleys so as to augment the signal contrast. The result after filtering is represented by curve 13. The effect of the post filtering is the enhancement of the intelligibility of speech. This is a subjective indicator that depends on the sensibility of the ear. A post filter may be used for processing speech signals, notably for improving the intelligibility and partly compensating for losses and errors due to coding, decoding and transmission. The post filter has many applications in speech decoders and noise cancelers.

Figure 2:
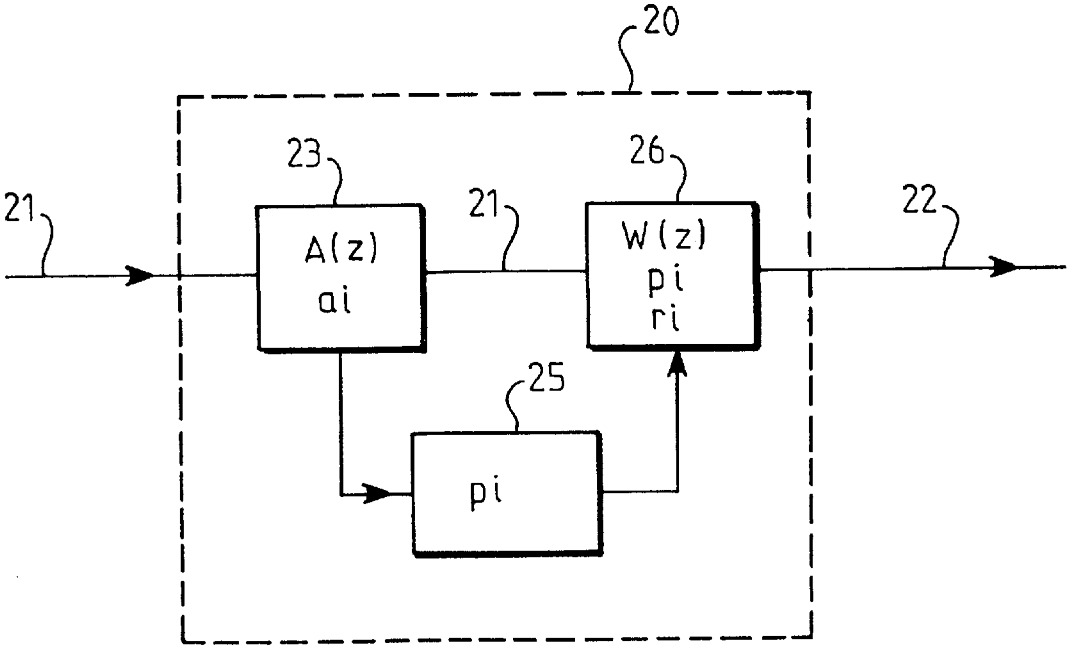
FIG. 2 shows in a diagram a filter device according to the invention.

FIG. 2 shows in a diagram a post filter device 20 according to the invention, receiving on the input a speech signal 21 that has a spectrum of the type of that referenced 11 in FIG. 1 and producing on the output a filtered signal 22 whose spectrum may be represented by the curve 13. It includes a short-term predictive analysis circuit 23 of the LPC type for determining the LPC parameters of the speech signal and an extraction circuit 25 that cooperates with a calculation element 26 for extracting values of poles from the output of the predictive analysis circuit 23 and for supplying them to the input of the calculation element 26 for synthesizing a digital zeroes/poles post filter intended to filter the speech signal 21 so as to obtain the signal 22.

According to this example, the input signal 21 is sampled at a frequency Fe, about twice the highest frequency of the original speech signal, so that the predictive analysis circuit 23 determines every 160 samples, for example, the LPC parameters of the speech signal. These parameters, denoted as, are obtained by means of an LPC analysis filter A(z) whose equation is written as, for example:

$$A(z) = 1 + \sum_{i=1}^{m} a_i z^{-i}$$

m being the prediction order of the filter. At the output of the filter A(z) is obtained, in addition to the parameters $a_i$, the residual error of the signal that will then be filtered by a synthesis filter which is the inverse of the analysis filter, so as to reproduce the speech signal before the post filtering.

Figure 5:
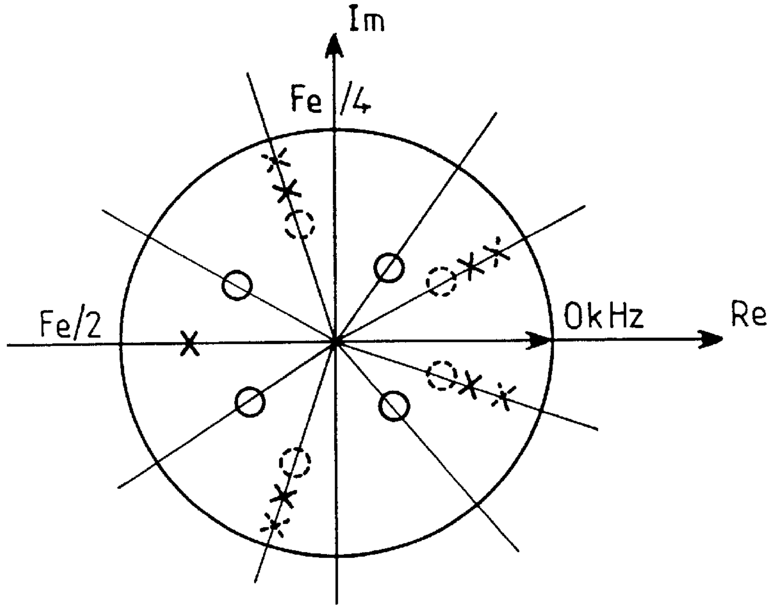
FIG. 5 is a representation of the position of the poles and zeroes of the post filter according to the invention inside the unit circle.

The poles of the post filter intended to produce the signal 22 are supplied to the calculation element 26 by the extraction circuit 25 which obtains them by extracting the roots $p_i$ of the polynomial A(z). For calculating the zeroes, the calculation element 26 first carries out a classification of the roots $p_i$ in the order of rising frequencies between 0 and about 4 kHz, this sampling frequency Fe being in the neighborhood of 8 KHz. Then, the values of <<zeroes>> are obtained denoted $r_i$ via an interpolation calculation between the roots $p_i$ of the polynomial A(z):

$$r_i = \frac{\alpha_1 p_i + \alpha_2 p_{i-1}}{2}$$

where $\alpha_1$ and $\alpha_2$ are positive weight factors representing the relative weight of the poles for the calculation of the zeroes. The frequencies corresponding to the values of zeroes thus find themselves between the pole frequencies. The poles and the zeroes of the post filter being determined, the calculation element 26 synthesizes the post filter W(z) whose equation is written as:

$$W(z) = \frac{1 + b_1(z/\chi_n)^{-1} + b_2(z/\chi_n)^{-2} + \ldots + b_m(z/\chi_n)^{-m}}{1 + a_1(z/\chi_d)^{-1} + a_2(z/\chi_d)^{-2} + \ldots + a_m(z/\chi_d)^{-m}}$$

where $a_i$ are the LPC parameters coming from the analysis circuit 23 and $b_i$ the coefficients of the polynomial formed on the basis of the previously calculated values $r_i$, $\chi_d$ and $\chi_n$ are weight factors indicating the distance from the root to the unit circle as illustrated in FIG. 5, with $\chi_n < \chi_d < 1$.

Figure 3:
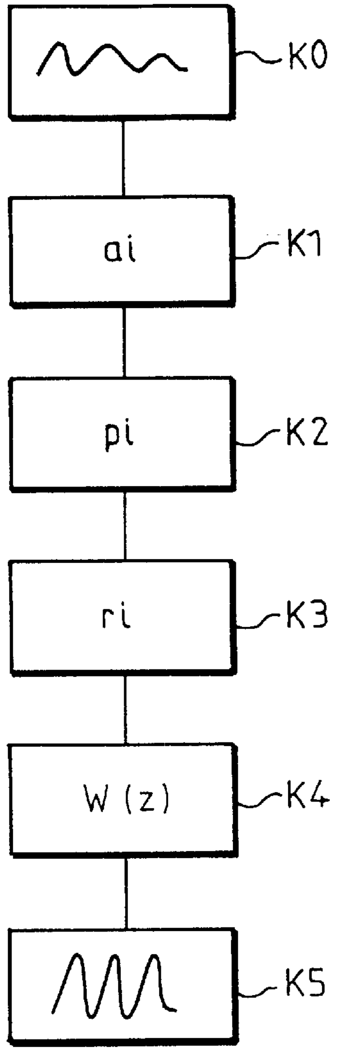
FIG. 3 is a flow chart for illustrating a filtering method according to the invention.

An example of a filter method according to the invention will now be described in detail with the aid of FIG. 3. It comprises the steps K0 to K5 whose order of execution may be subjected to certain variants. The first, K0, is a receiving step of an analog or digital speech signal, having a frequency spectrum that features slopes separated by valleys. The second step, K1, carries out a short-term predictive analysis of the received signal to determine the coefficients $a_i$ of the LPC analysis filter which are characteristic of the signal to be processed. The step K2 consists of extracting roots $p_i$ from the LPC filter. The step K3 carries out an interpolation between the roots $p_i$ so as to derive values $r_i$ therefrom. The step K4 is a synthesis step of a digital zeroes/poles filter W(z) whose poles are the roots $p_i$ of the LPC filter and whose zeroes are the values $r_i$. Finally, step K5 consists of applying the synthesis filter to the speech signal to produce on the output a signal whose spectrum is modified relative to the spectrum of the input signal in the way that the slopes have been increased and the valleys have been accentuated.

Figure 4:
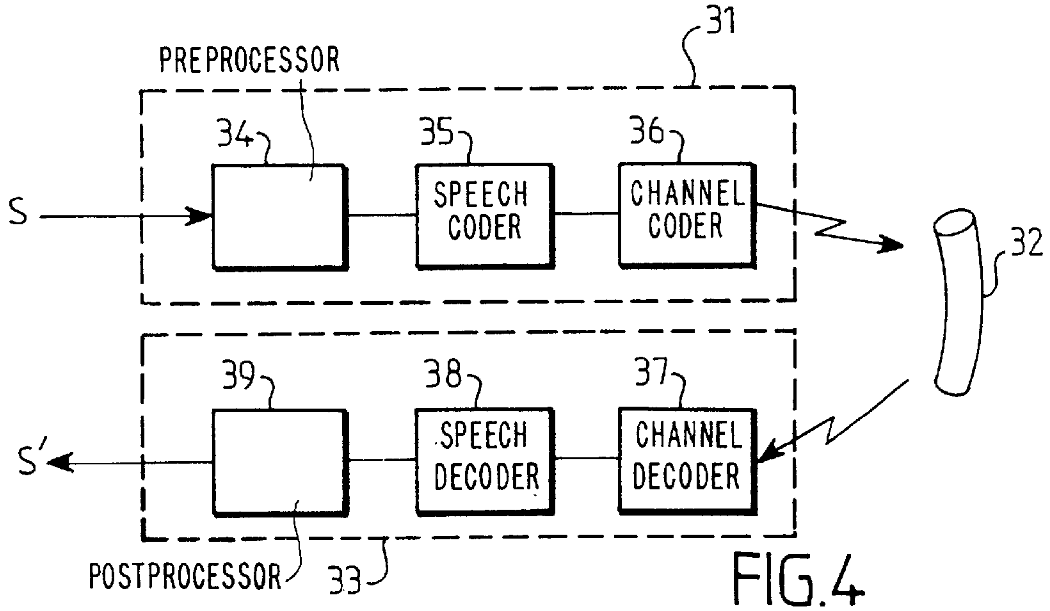
FIG. 4 is a basic circuit diagram of a baseband communications system according to the invention.

According to variants of embodiment of this method, certain steps whose aim is to produce calculation or analysis results used in other steps, can be realized before step K0 of the reception of the signal. Let us take the example of the GSM system whose communications circuit is shown in FIG. 4. According to the GSM standard, an LPC analysis is carried out during the transmission of the message while the speech signal is being coded. The LPC parameters, used for producing the speech model that will then be transmitted by the transmitting channel, are then available once the message has been transmitted, whereas the post filter method is executed at the end of the receiving circuit.

In, for example, a GSM application the predictive analysis step of the speech signal K1 may thus advantageously be carried out independently of the post filter method before the signal receiving step K0 according to said method, and the results will be tapped from the speech coder for synthesizing the speech and post filter. One may also prefer again making an LPC analysis specially for the post filter as in the general case. In a communications system that does not provide an LPC analysis, this predictive analysis step may be realized upon reception of the signal, or also of the already decoded signal, possibly by the decoder itself.

FIG. 4 is a block diagram of a conventional digital baseband communications system. It comprises a transmission circuit 31 via a transmission channel 32 and a receiving circuit 33. According to an embodiment of the invention, particularly suitable for the GSM system, the original speech signal S whose frequency spectrum is represented by the curve 11 in FIG. 1 is received on the input of the transmission circuit 31, whereas the filtered speech signal S' whose spectrum is represented by the curve 13 is produced on the output of the receiving circuit 33. At the transmitter end the system comprises a preprocessing block 34, a speech coding block 35, a channel coding block 36 and, at the receiving end, a channel decoding block 37, a speech decoding block 38 and a post-processing block 39.

The pre-processing block 34 prepares the speech signal for the decoding. The speech coding 35 consists of modeling the speech and reducing the quantity of data to be transmitted. For this purpose, a method is used that includes a short-term prediction such as described in Recommendation ETS 300 961, dated December 1997, second edition, paragraph 3.1, for producing a speech model featured by LPC filter parameters. These parameters are transmitted to the decoding block 38 to reconstitute the voice message. The analysis filter A(z) used for extracting the LPC characteristics of the speech signal may be written as, for example:

$$A(z) = 1 + \sum_{i=1}^{m} a_i z^{-i}$$

where $a_i$ are the LPC parameters and m is the prediction order of the filter.

The channel coding block 36 prepares the data for the transmission and the channel decoding block 37 decodes the data transmitted so as to enable the speech decoder 38 to reconstitute the voice message according to the inverse coding process. It thus receives the speech model transmitted by the channel and applies that to the synthesis filter denoted 1/A(z) which is the inverse of the analysis filter:

$$\frac{1}{A(z)} = \frac{1}{1 + \sum_{i=1}^{m} a_i z^{-i}}$$

The post-processing block 39 has for its aim to improve the audio quality of the signal produced on the output and, more particularly, its intelligibility. A conventional post filter is written in the form of:

$$W(z) = \frac{1 + a_1(z/\chi_n)^{-1} + a_2(z/\chi_n)^{-2} + \dots + a_m(z/\chi_n)^{-m}}{1 + a_1(z/\chi_d)^{-1} + a_2(z/\chi_d)^{-2} + \dots + a_m(z/\chi_d)^{-m}}$$

where $a_i$ are the LPC parameters and $\chi_n$, $\chi_d$ are weight factors indicating the distance from the root to the unit circle as illustrated in FIG. 5, with $\chi_n<\chi_d<1$. It is observed that the poles but also the zeroes, are situated at the same frequencies as the slopes, which mainly leads to a limitation of their accentuation relative to the valleys.

In the post filter according to the invention, the zeroes are calculated to be placed at about halfway the poles for considerably accentuating the sought phenomenon. This positioning of the poles and zeroes increases the accentuation of the slopes by increasing the amplitude of the maximums and diminishing the amplitude of the minimums. The values of zeroes are obtained artificially via a calculation of the interpolation between the values of poles extracted from the LPC analysis:

$$r_i = \frac{\alpha_1 p_i + \alpha_2 p_{i-1}}{2}$$

where $p_i$ are the poles of the LPC synthesis filter arranged in rising frequency order and where $\alpha_1$ and $\alpha_2$ are positive factors. Thus the post filter is written as:

$$W(z) = \frac{1 + b_1(z/\chi_n)^{-1} + b_2(z/\chi_n)^{-2} + \dots + b_m(z/\chi_n)^{-m}}{1 + a_1(z/\chi_d)^{-1} + a_2(z/\chi_d)^{-2} + \dots + a_m(z/\chi_d)^{-m}}$$

where $b_i$ are the coefficients of the polynomial formed on the basis of the $r_i$ values previously calculated while $\chi_d$ and $\chi_n$, are weight factors indicating the distance from the root to the unit circle as illustrated in FIG. 5, with $\chi_n<\chi_d<1$.

The relative position of the zeroes and of the poles is represented in the unit circle in FIG. 5. The crosses indicate the values of poles and the noughts the values of zeroes of the post filter W(z). The angle of the point under consideration relative to the x-axis indicates its frequency. The distance from the point relative to the center of the circle indicates its amplitude. Also indicated in the Figure in dotted lines are the values of zeroes and poles of a conventional post filter. It is observed that in the case of the conventional post filter the poles and the zeroes are situated at the same frequencies, which are also the frequencies of the slopes. On the other hand, in the post filter according to the invention, the zeroes are situated at an intermediate frequency between 2 poles.

Conventional post filters produce a signal whose sound aspect is all the more synthetic as they improve the intelligibility. As a result of an advantage of the invention, this post filtering produces an output signal whose synthetic sound is marked lower than for conventional post filters, while notably the intelligibility of the speech signal is augmented. The result is a real improvement of the audio quality of the speech signal on the output of the communications circuit.

Figure 6:
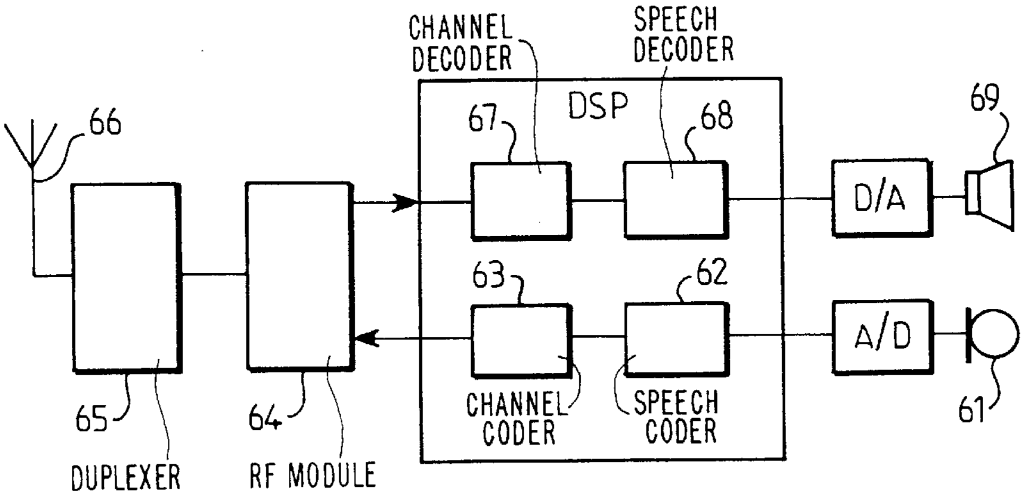
FIG. 6 is a block diagram of a telephone receiver according to the invention.

The telephone receiver shown in the diagram of FIG. 6 comprises a transmission circuit formed by a microphone 61, an analog/digital converter A/D, a speech coder 62, a channel coder 63 and a module dedicated to the radio-frequency part 64 connected to a duplexer 65 coupled to a transceiver antenna 66. The receiving circuit further includes the antenna 66, the duplexer 65 and the radio module 64, a channel decoder 67, a speech decoder 68, a digital/analog converter D/A and an earphone 69. The blocks 62, 63, 67 and 68 may be realized by a processor of the DSP type (Digital Signal Processor).

According to a preferred embodiment of the invention, the LPC analysis part is effected in the DSP near the speech coder 62 and the post filtering part forms part of the speech decoder 68.

There has just been described and illustrated by means of examples a speech signal, a device and a filter method, a telephone receiver and a communications system for improving the intelligibility of the speech signal. Obviously, it will be possible to give variants of embodiment without leaving the scope of the invention, notably as regards the structure of the filters used for the short-term predictive speech analysis and synthesis.

What is claimed is:

1. A digital filter device for filtering a speech signal having a frequency spectrum featuring slopes separated by valleys, the digital filter device including:

a predictive analysis circuit of the speech signal and a calculation element for synthesizing a post filter having poles and zeros for amplifying the slopes and deepening the valleys, an extraction circuit for extracting pole values of said poles from an output of the predictive analysis circuit and for supplying said pole values to a calculation element, and calculation means for determining zero values of said zeroes between said pole values.

2. A digital filter device as claimed in claim 1, wherein said predictive analysis circuit includes an LPC analysis filter represented by a polynomial having roots, and wherein the extraction circuit extracts said roots to derive therefrom the pole values of said poles of the post filter.

3. A digital filter device as claimed in claim 1, wherein the pole values of said poles denoted $p_i$ are classified in an order of rising frequencies, and wherein the zero values of said zeroes denoted $r_i$ are determined in accordance with equation:

$$r_i = \frac{\alpha_1 p_i + \alpha_2 p_{i-1}}{2}$$

where $\alpha_1$ and $\alpha_2$ are positive weight factors, and i is an order of said digital filter.

4. A telephone receiver for receiving a speech signal having a frequency spectrum featuring slopes separated by valleys, said telephone receiver including:

a predictive analysis circuit of the speech signal;

a calculation element for synthesizing a zeroes/poles digital post filter to increase the slopes and deepen the valleys;

an extraction circuit for extracting pole values of poles of said zeroes/poles digital post filter from an output of the predictive analysis circuit and for supplying said pole values to said calculation element; and calculation means for determining zero values of zeroes of said zeroes/poles digital post filter between said pole values of said poles.

5. A baseband speech signal communications system having at least one transmission channel and including:

a predictive speech coder/decoder for reconstituting a digital speech signal based on an original coded signal transmitted by said channel, a filter for filtering said digital speech signal, wherein the filter includes:

calculation means for synthesizing a digital zeroes/poles filter, an extraction circuit for extracting pole values of poles of said digital zeroes/poles post filter from an output of the predictive speech coder/decoder, and calculation means for determining zero values of zeroes of said digital zeroes/poles post filter between said pole values of said poles.

6. A baseband speech signal communications system as claimed in claim 5, wherein the predictive speech coder/decoder includes LPC analysis means for determining coefficients of an LPC analysis filter having roots, and wherein the extraction circuit includes means for extracting said roots and deriving therefrom the pole values of said poles.

7. A digital filter method for filtering a speech signal that has a frequency spectrum featuring slopes separated by valleys, in order to increase the slopes and to deepen the valleys, including:

a predictive analysis step of the speech signal for determining LPC coefficients, a first calculation step for synthesizing a zeroes/poles filter based on said LPC coefficients, and a filter step for applying said zeroes/poles filter to the speech signal, wherein the calculation step includes:

an extraction step to extract roots of an LPC polynomial formed on a basis of said LPC coefficients for deriving from said roots pole values of poles of said zeroes/poles filter, and a second calculation step for determining zero values of zeroes of said zeroes/poles filter between said pole values of said poles.

8. A speech signal obtained by applying a digital zeroes/poles filter to a first speech signal that has a frequency spectrum featuring slopes separated by valleys, said first speech signal being modeled by an inverse all-pole filter, wherein values of the zeroes/poles filter are obtained by extracting pole values of poles from said inverse all-pole filter and calculating zero values of zeroes between said poles values of said poles of said inverse all-pole filter.

9. A digital filter device as claimed in claim 1, wherein said zeroes have zero frequencies which are between pole frequencies of said poles.

* * * * *